3,436,128
BELT FOR SNOWMOBILES
Evariste Boulanger, La Guadeloupe, Quebec, Canada
Filed May 4, 1967, Ser. No. 636,054
Claims priority, application Canada, Oct. 29, 1966,
974,404
Int. Cl. B62d 55/08; F16g 1/12, 5/10
U.S. Cl. 305—38                                             3 Claims

ABSTRACT OF THE DISCLOSURE

An endless drive belt for snowmobiles, having a plurality of elongate reinforcing rods positioned transversely to the direction of travel of the belt. The central portion of each rod being offset from the end sections and passing through apertures provided in the belt, wherein the central portion of the rods are positioned on the ground-contacting side of the belt and the end sections of the belt are positioned on the non-ground-contacting side.

---

The present invention relates to an endless belt, and particularly to an endless belt of the type commonly used as a support and drive belt for small snowmobiles and snow skooters and the like.

In such snowmobiles the endless driving belt is supported on two or more cylindrical rollers or the like presenting the belt in ground- or snow-contact beneath the snowmobile. One of the rollers is provided with a set of sprocket teeth for engagement with two sets of longitudinally aligned holes in the belt whereby rotation of the roller by power means, usually a two-cycle internal combustion engine, results in rotation of the belt and movement of the snowmobile. The front portion of the snowmobile is usually supported on a set of skiis which are connected to a handle to provide steerage.

Endless belts for use on snowmobiles are usually made of tough rubber or the like material molded over a cord or nylon liner, although belts having an inner support consisting of flexible metallic mesh are also known. The belts are usually further supported by a plurality of reinforcing rods positioned laterally across the belt, usually one between the sprocket tooth engaging holes, and it is to a novel construction of these reinforcing rods that the present invention is primarily directed.

In known endless belt construction the reinforcing rods are completely embedded in the rubber belt as a result of molding the rubber belt-forming material completely thereover. This has the advantage of providing substantially noiseless operation of the belt when the snowmobile is being driven over concrete or asphalt surfaces, but is a disadvantage when one or more of the reinforcing rods bend or break as individual replacement of the rods is not possible and a completely new belt is required.

The principal object of the present invention then is to provide a novel endless belt construction wherein the laterally extending reinforcing rods are not molded within the rubber material but are completely accessible for individual replacement as occasion arises.

It is a further object of the present invention to provide an endless belt construction wherein the laterally positioned reinforcing rods may independently be removed and replaced when damaged, and yet which is substantially noiseless in operation on concrete or asphalt surfaces.

It is also an object of the invention to provide an endless driving belt for snowmobiles or the like having ground-contacting and non-ground-contacting surfaces, said belt having one or more sets of longitudinally aligned holes for receiving sprocket teeth provided on a snowmobile drive roller, on a plurality of generally elongate rods arranged transversely to the direction of travel of the belt, the rods having central offset portions positioned in grooves provided in the ground-contacting side of the belt, and the end portion of the rods positioned in grooves provided in the non-ground-contacting side of the belt, the rods passing through the belt through holes provided therein; the ends of the rods are formed as loops and the rods are secured to the belt by rivets or the like passing through the loops and the belt.

Having described the invention in general terms it will now be more specifically described with reference to the accompanying drawings wherein.

Figure 1:
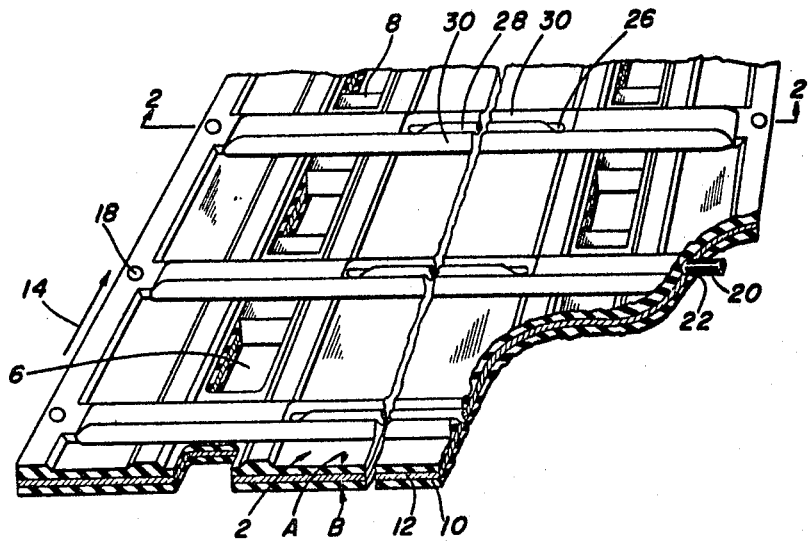
FIGURE 1 illustrates in perspective view a portion of an endless belt in accordance with the referenced invention.
Figure 2:
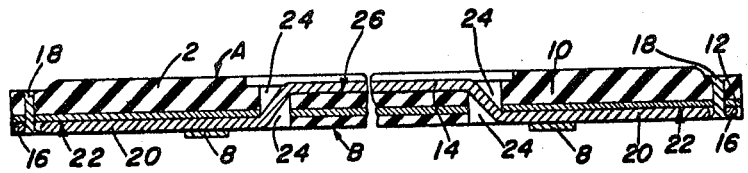
FIGURE 2 is a sectional view taken along line 11—11 of FIGURE 1 and illustrates the novel reinforcing rod of this invention.

In the attached drawings the belt is indicated generally by the reference numeral 2, and is arranged on the snowmobile to travel in the direction of arrow 4. For clarity an outer ground-contacting side or surface of the belt is indicated in FIGURES 1 and 2 by the letter A, and inner non-ground-contacting side or surface of the belt is indicated by the letter B. The two sets of longitudinally arranged holes 6 are to receive sprocket teeth provided on the power-driven roller (not shown) of the snowmobile to drive the belt. The portions of the belt between each of the holes 6 may be provided with a metal sprocket strip 8 to minimize tear on the belt at these points by the sprocket teeth.

The belt may be made of hard rubber or the like material 10 molded over and covering a cord or the like core 12.

Such belt construction is known in the art, and in such belts it is usual that a rod extending laterally to the direction of travel of the belt and between the sprocket teeth receiving holes is molded integrally within the belt.

In a present and novel structure the reinforcing rods are attached to the belt for removal and replacement when damaged which is not possible in known belt construction.

Figure 3:
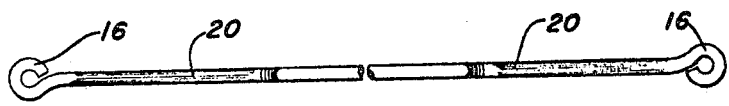
FIGURE 3 illustrates a reinforcing rod in top view.

The novel reinforcing rods indicated generally at 14 of the present invention are generally elongated and of a length slightly shorter than the width of the belt 2, and each end of the rods is formed as a loop 16 (see FIGURES 2 and 3) to receive a rivet 18 or the like to secure the rod to the belt. The loops 16 and a length 20 at each end of the rod 14 are received in grooves 22 provided in the non-ground-contacting side B of the belt. The grooves extend inwardly past the longitudinal rows of socket holes 6 and open into holes 24 through which the rods pass. The central section of the ground-contacting portion of the belt between the longitudinal rolls of sprocket teeth receiving holes 24 is also provided with a rod receiving groove 26 to receive the central portion 28 of the rod. As will be clearly evident from FIGURE 2, the central portion 28 of the rod is offset from the end sections whereby the central portion 28 of the rod sits in a groove provided in the ground-contacting side A of the belt and the end portions 20 of each rod sit in grooves provided in the non-ground-contacting side B of the belt. The rods are secured to the belt by rivets 18 or the like passing through the belt and the loops 6.

With this accessibility removal of the rod for repair or replacement is possible.

The portion 28 of the rods positioned on the ground-contacting side A of the belt are recessed in grooves 26 to prevent contact of the rods with concrete, asphalt or rock surfaces and hence minimize noise and wear. To further reduce the contact between the rod and ground and to increase traction of the belt a laterally extending ridge of rubber 30 may be formed along each side of the groove as shown in FIGURES 1 and 2, and extend outwardly toward the rivets 18 as shown.

The rod in cross-section need not necessarily be circular as shown, but may be flattened or oval, etc.

I claim:

1. An endless driving belt for snowmobiles or the like having an outer ground-contacting and an inner non-ground-contacting surface, said belt having one or more sets of longitudinally aligned holes for receiving sprocket teeth provided on a snowmobile drive roller, said belt having a plurality of transversely extending centrally located elongated first grooves formed in and opening into the ground-contacting side thereof and in open communication at each of their respective ends with an aperture extending through said belt, said belt having a plurality of second grooves formed in the non-ground-contacting surface, said second grooves extending transversely of said belt and having inner ends each communicating with, respectively, one of said apertures, a plurality of elongate reinforcing rods arranged transversely to the direction of travel of said belt and corresponding in number to the number of said grooves, said rods each having a central offset portion intermediate its ends, each end of each of said rods terminating in an open loop, said central offset portion of each of said rods being disposed, respectively, in one of said first grooves with the opposed ends of each of said rods extending through the adjacent one of said apertures to seat in the adjacent one of said second grooves in said non-ground-contacting surface, and fastening means extending through said loops and belt to secure said rods thereon.

2. A belt according to claim 1 wherein the belt is provided with ridges formed adjacent both sides of the groove formed in the ground-contacting side of the belt.

3. A belt according to claim 1 wherein the sprocket teeth receiving holes are lined with metal clips to reduce wear.

References Cited

UNITED STATES PATENTS

| | | | |
|---|---|---|---|
| 1,501,097 | 7/1924 | Chase. | |
| 2,290,109 | 7/1942 | Mayne | 305—38 |
| 2,449,421 | 9/1948 | Slemons | 305—38 |
| 2,899,242 | 8/1959 | Bombardier | 305—38 |
| 3,285,677 | 1/1966 | Marier | 305—38 |

RICHARD J. JOHNSON, *Primary Examiner.*

U.S. Cl. X.R.

74—237